G. W. WILLIAMS.
STRAW SPREADER.
APPLICATION FILED APR. 10, 1919.

1,338,544. Patented Apr. 27, 1920.
2 SHEETS—SHEET 1.

Witness:
Stephen F. Pehoa

Inventor:
George W. Williams
by Charles C. Bulkley
Attys

G. W. WILLIAMS.
STRAW SPREADER.
APPLICATION FILED APR. 10, 1919.
1,338,544. Patented Apr. 27, 1920.
2 SHEETS—SHEET 2.
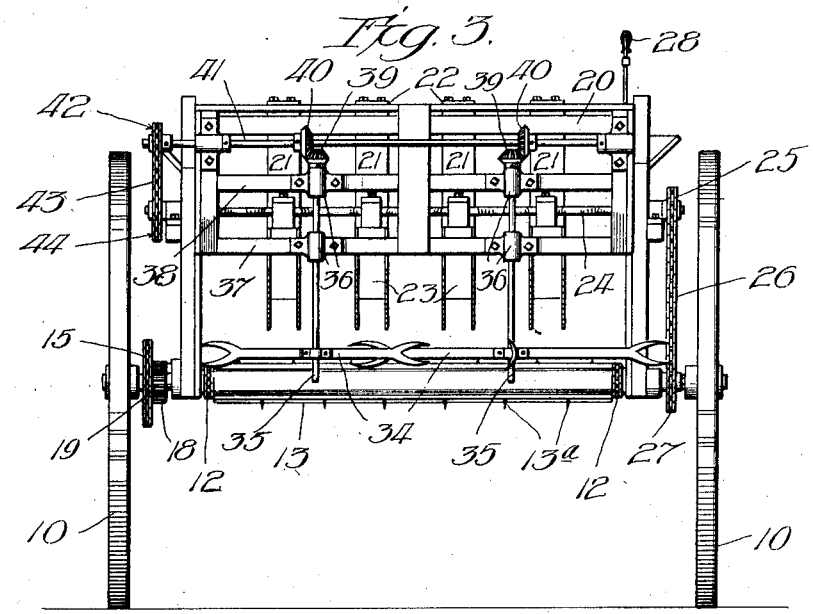
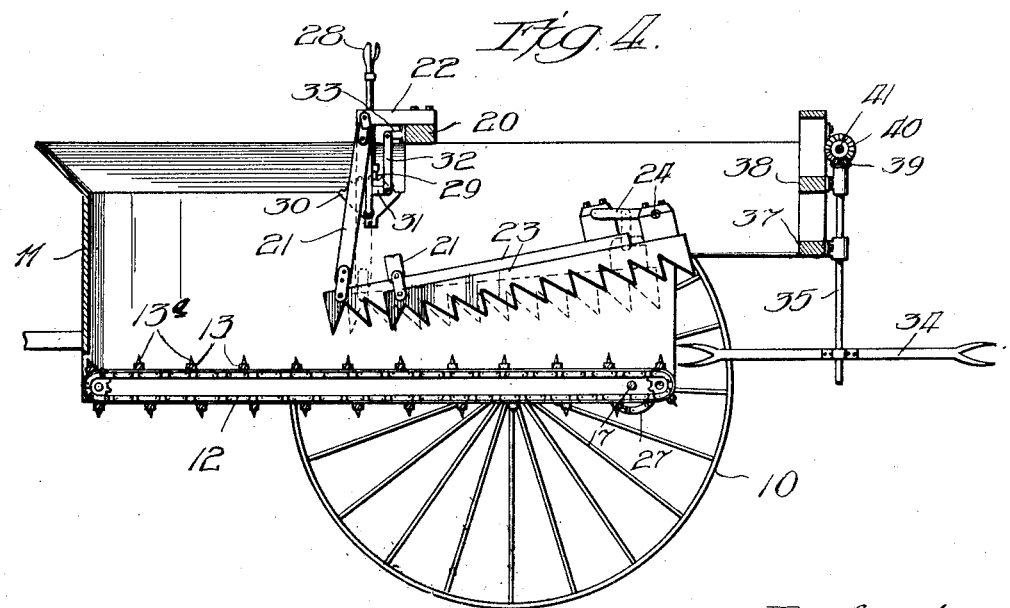

UNITED STATES PATENT OFFICE.

GEORGE W. WILLIAMS, OF MORRIS, ILLINOIS.

STRAW-SPREADER.

1,338,544.	Specification of Letters Patent.	Patented Apr. 27, 1920.

Application filed April 10, 1919. Serial No. 289,042.

*To all whom it may concern:*

Be it known that I, GEORGE W. WILLIAMS, a citizen of the United States of America, and resident of Morris, Grundy county, Illinois, have invented a certain new and useful Improvement in Straw-Spreaders, of which the following is a specification.

My invention relates to an improvement in straw spreaders, and has for its object the provision of an improved construction, whereby the straw or other material to be spread is thoroughly torn apart and shredded and then scattered uniformly over the surface of the ground. By my construction the straw is positively fed through the machine, and during this time it is torn apart by reciprocating raking members, any bunches of straw being thus broken up before they reach the rapidly rotating beaters at the rear of the wagon, which operate to scatter the straw in a uniform layer over a comparatively wide path.

These and other features and objects of my invention will be more readily understood by having reference to the accompanying drawings, in which I have illustrated one embodiment of my invention.

Fig. 3 is a rear elevation.

Fig. 4 is a sectional view taken on the line 4—4 of Fig. 1, looking in the direction of the arrows.

Figure 1:
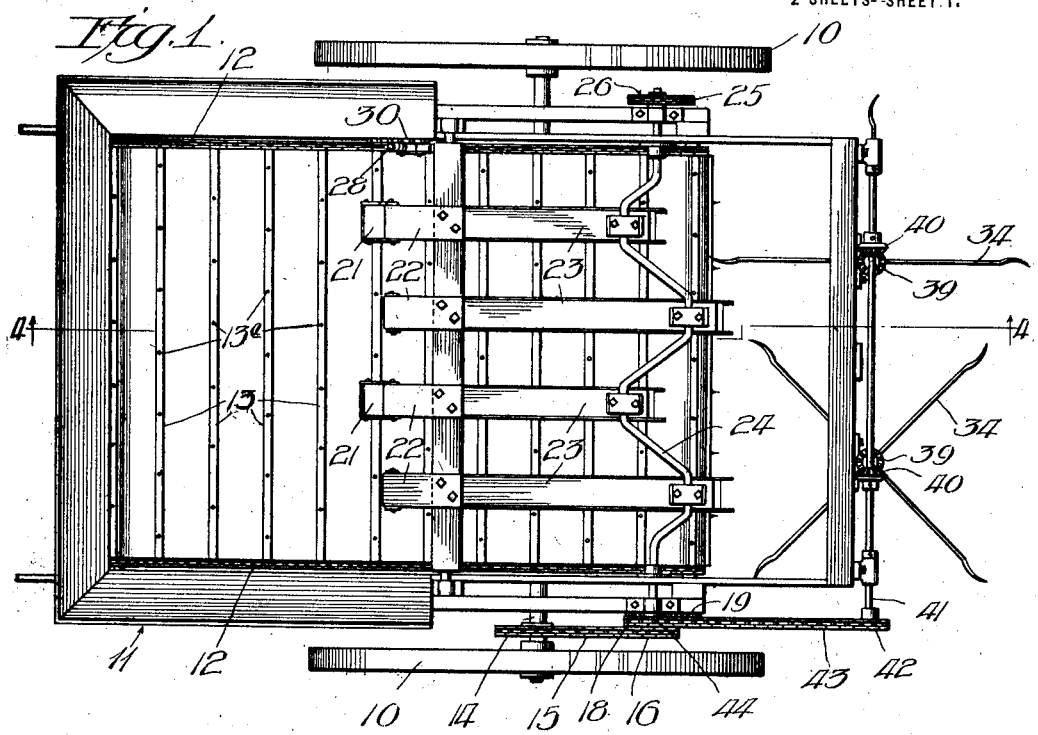
Figure 1 is a plan view of a straw spreader embodying the features of my invention.
Figure 2:
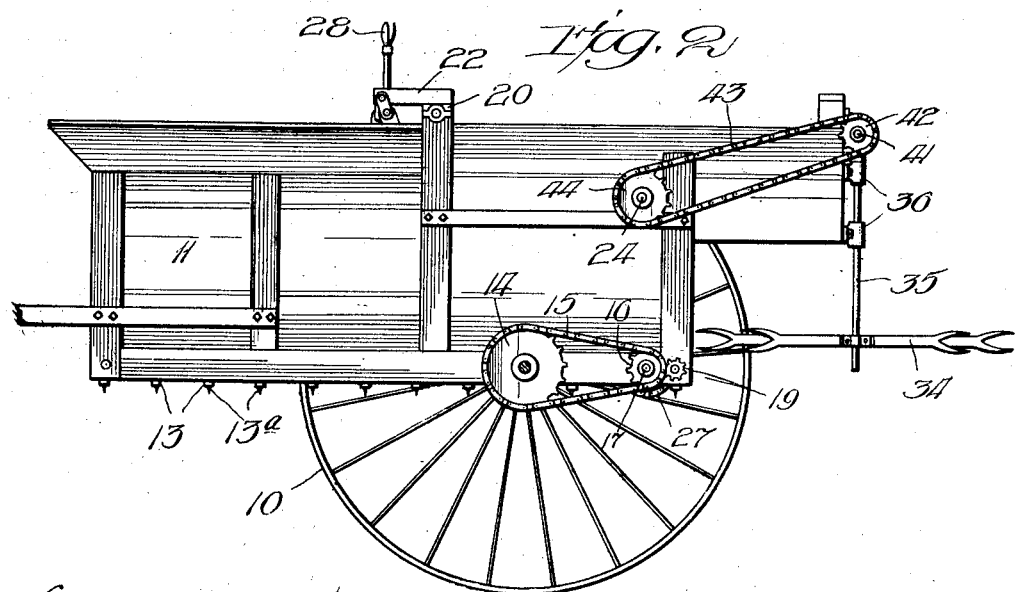
Fig. 2 is a side elevation with the near wheel removed in order to more clearly show the driving mechanism.

The straw spreader illustrated consists essentially of a cart mounted on two wheels 10, 10, which cart is adapted to be hitched to the rear of the wagon in any suitable manner. The cart comprises a body portion 11, the bottom of which is formed by means of a movable apron 12 passing over suitable rollers at the front and rear of the cart. Mounted upon this apron, there are a plurality of cross slats 13, provided with upwardly projecting pins or teeth 13ª. This apron is driven from the wheels 10 through the medium of the sprocket wheel 14 mounted upon the axle which drives a chain 15, passing over a second sprocket 16, mounted upon a cross shaft 17. On this cross shaft, there is a gear 18 which meshes with a second gear 19, mounted on the rear roller for the apron. In this manner, as the cart is drawn forwardly, the apron is revolved so as to positively feed the material toward the rear of the cart.

Mounted intermediate of the length of the cart and supported by the sides thereof, there is a cross beam 20, which supports a plurality of hangers or suspending members 21. The upper end of each of these hangers is hinged to a short horizontal member 22 rigidly secured to the cross beam 20. The lower end of each of these hangers 21 is hinged to the forward end of a reciprocating toothed bar or rake 23. In the construction illustrated, I have shown four of these rakes suspended from the cross beam 22, but, of course, it will be understood that the number of these rakes can be varied. The rear ends of these rakes are supported by a crank shaft journaled in opposite sides of the cart near the rear end thereof, which crank shaft is provided with a sprocket 25, with which a chain 26 engages, this chain likewise passing over a sprocket 27 mounted upon the end of the cross shaft 17. In this manner, the crank shaft is rotated by power derived from the wheels 10. These rakes are so mounted that their forward ends are slightly lower than their rear ends, and in order to adjust the distance between the forward ends of these rakes and the conveyer 12, to thereby regulate the amount of straw being fed, I provide means for rocking the cross beam 20. This means consists of a hand-lever 28 pivoted at its lower end to one side of the cart, which lever is provided with the usual spring tooth 29, which engages with a rack 30 for holding the lever in any adjusted position. Rigid with this hand lever there is a short laterally projecting arm 31 to the end of which a link 32 is pivoted, the upper end of this link being pivoted to the arm 33 secured to the cross beam 20. By this construction, it will be seen that when the hand-lever 28 is moved forward from its position shown in Fig. 4 that the link 32 moves upwardly so as to rock the cross beam 20. This causes the arm 22 to be rocked upwardly so as to pull up on the suspending hangers 21, and thus raise the forward ends of the rakes.

Suspended at the rear of the cart are a pair of rotary beaters or spreaders 34, mounted on vertically extending rods 35, journaled in bearings 36 carried by suitable cross bars 37, 38. On the upper ends of each of these vertical rods are mounted a bevel pinion 39 which meshes with a corresponding bevel pinion 40 carried by a transverse shaft 41. The end of this shaft is provided with a suitable sprocket 42 which is driven by means of a sprocket chain 43 passing over a sprocket 44 mounted upon the end of the crank shaft 24.

The various gears and sprockets are so proportioned that the rakes 23 travel at a faster rate of speed than does the conveyer 12, these rakes traveling nearly twice as fast as the conveyer. Likewise the rotary beaters are so geared that they travel at a much higher rate of speed than do the other parts of the mechanism, these beaters traveling as high as 200 or 300 revolutions a minute.

In the operation of the machine, the straw is first pitched into the forward part of the cart which forms a hopper, and the traveling apron at the bottom of this hopper operates to feed the material toward the rear of the cart. The reciprocating rakes operate to regulate the amount of straw which is fed rearwardly, preventing bunches of this straw from being carried along the conveyer, and by reason of the fact that these rakes are being reciprocated at a higher rate of speed than the conveyer is moving, the teeth of the rakes engage with the straw and drag or tear the same over the teeth on the conveyer, thus thoroughly shredding the straw and breaking up any bunches of the same, and in this manner delivers the straw in a finely divided and shredded condition to the rapidly reciprocating beaters or spreaders at the rear of the machine. These spreaders rotating at a high rate of speed engage the straw thus delivered from the rear of the cart and uniformly spread the same over the surface of the ground and over a comparatively wide path. That is, by means of these beaters, it is possible to spread a strip much wider than the width of the cart.

It will thus be seen that I have devised a very efficient form of spreader, and one in which the straw is thoroughly shredded and then uniformly spread over a comparatively wide area. While I have illustrated and described one particular embodiment of my invention, it will be understood that I do not wish to be limited to the exact construction shown and described, but that various changes and modifications may be made without departing from the spirit of my invention.

What I claim as my invention is:—

1. In a straw spreader, a suitable hopper, a traveling apron in the bottom of said hopper, and a plurality of reciprocating rakes for regulating the amount of material fed to the rear of the machine, said rakes being reciprocated at a higher rate of speed than the travel of the conveyer, and provided with a plurality of rearwardly inclined teeth for feeding the material rearwardly, the front tooth being forwardly inclined to thereby push back any excess material, and thus regulate the amount of feed.

2. In a straw spreader, a suitable hopper, a traveling apron in the bottom of said hopper, and a plurality of reciprocating rakes for regulating the amount of material fed to the rear of the machine, and one or more spreaders provided with a plurality of radial arms arranged in a horizontal plane, and means for rotating said arms so as to engage the material as it is delivered from the rear of the machine for spreading the same uniformly over the surface of the ground.

3. In a straw spreader, a suitable hopper, a traveling apron in the bottom of said hopper, a plurality of reciprocating rakes for feeding the material to the rear of the machine, said rakes being reciprocated at a higher rate of speed than the travel of the conveyer, and one or more spreaders provided with a plurality of radial arms arranged in a horizontal plane, and means for rotating said arms so as to engage the material as it is delivered from the rear of the machine for spreading the same uniformly over the surface of the ground.

4. In a straw spreader, a suitable hopper, a traveling conveyer in the bottom of said hopper, said conveyer having a plurality of projecting teeth and a plurality of reciprocating rakes mounted above said conveyer for feeding the material to the rear of the machine, said rakes being reciprocated at a higher rate of speed than the travel of said conveyer, whereby said rakes engage the straw to draw the same over the teeth of said conveyer to thereby tear and shred the straw being fed through the machine.

5. In a straw spreader, a suitable hopper, a traveling conveyer in the bottom of said hopper, said conveyer having a plurality of projecting teeth, a plurality of reciprocating rakes mounted above said conveyer for feeding material to the rear of the machine, said rakes being reciprocated at a higher rate of speed than the travel of said conveyer, whereby said rakes engage the straw to draw the same over the teeth on said conveyer to thereby tear and shred the straw being fed through the machine, and one or more rotating spreaders adapted to engage the material as it is delivered from the rear of the machine for spreading the same uniformly over the surface of the ground.

6. In a straw spreader, a suitable hopper, a traveling conveyer in the bottom of said hopper, said conveyer having a plurality of projecting teeth, a plurality of reciprocating rakes mounted above said conveyer for feeding material to the rear of the machine, a crank shaft mounted transversely of the machine and connected to the rear ends of said reciprocating rakes, swinging means for supporting the front ends of said rakes, and means for driving said crank shaft to thereby reciprocate said rakes at a higher rate of speed than the travel of said conveyer, whereby said rakes engage the straw to draw the same over the teeth of said conveyer to thereby tear and shred the straw being fed through the machine.

7. In a straw spreader, a suitable hopper, a traveling conveyer in the bottom of said hopper, said conveyer having a plurality of projecting teeth, a plurality of reciprocating rakes mounted above said conveyer for feeding material to the rear of the machine, a crank shaft mounted transversely of the machine and connected to the rear ends of said reciprocating rakes, swinging means for supporting the front ends of said rakes, means for driving said crank shaft to thereby reciprocate said rakes at a higher rate of speed than the travel of said conveyer, whereby said rakes engage the straw to draw the same over the teeth of said conveyer to thereby tear and shred the straw being fed through the machine, and means for adjusting the front ends of said rakes to thereby vary the distance between said rakes and said conveyer and thus regulate the amount of material fed through the machine.

Signed by me at Morris, Ills., this 3rd day of April, 1919.

GEORGE W. WILLIAMS.